United States Patent

Sakamoto et al.

[11] Patent Number: 5,708,310
[45] Date of Patent: Jan. 13, 1998

[54] PERMANENT MAGNET TYPE STEPPING MOTOR

[75] Inventors: Masafumi Sakamoto; Youji Unoki, both of Gunma, Japan

[73] Assignee: Japan Servo Co., Ltd., Tokyo, Japan

[21] Appl. No.: 686,217

[22] Filed: Jul. 23, 1996

[30] Foreign Application Priority Data

Jul. 24, 1995 [JP] Japan ................. 7-207306
Nov. 10, 1995 [JP] Japan ................. 7-315849

[51] Int. Cl.$^6$ ............................... H02K 37/00
[52] U.S. Cl. .................. 310/49 R; 310/67 R; 310/254; 310/156
[58] Field of Search ................. 310/49 R, 254, 310/156, 154, 67 R

[56] References Cited

U.S. PATENT DOCUMENTS

| 4,112,319 | 9/1978 | Field ................. 310/49 R |
| 4,385,250 | 5/1983 | Welburn ............. 310/49 R |
| 4,516,048 | 5/1985 | Brigham ............. 310/49 R |
| 4,642,494 | 2/1987 | Lundin et al. ....... 310/49 R |
| 5,032,747 | 7/1991 | Sakamoto ........... 310/49 R |
| 5,128,570 | 7/1992 | Isozaki .............. 310/49 R |
| 5,410,200 | 4/1995 | Sakamoto et al. .... 310/49 |

FOREIGN PATENT DOCUMENTS

212149/91  1/1990  Japan.

Primary Examiner—Thomas M. Dougherty
Assistant Examiner—B. Mullins
Attorney, Agent, or Firm—Nilles & Nilles, S.C.

[57] ABSTRACT

A permanent magnet type stepping motor wherein and that at least one pitch formed by two adjacent small pole teeth of each of stator magnetic poles is different from other pitch formed by other two adjacent small pole teeth of each of the stator magnetic poles, wherein the tooth width of at least one of the two adjacent small pole teeth forming the different pitch is made different from that of the remaining small pole teeth, each stator magnetic poles having at least four small pole teeth and wherein a rotor has a rotor magnetic pole having a plurality of small pole teeth arranged at equal pitches, facing said stator magnetic poles through a gap. A permanent magnet type stepping motor has a stator having n pieces of stator magnetic pole each having m pieces of pole tooth, and a rotor having a plurality of pole teeth arranged at equal pitches n is an integer not less than three, m is an even number not less than four, a pitch of the rotor pole teeth is $2\pi$, a pitch formed between (m/2)th stator pole tooth and [(m/2)+1]th stator pole tooth is set to $(\tau \pm \theta_0)$, and the other pitch is set to $\tau$, where $|2\pi-\tau|<\pi/12$, $\pi/5 \leq \theta_0 < \pi/2$, and $\tau$ and $\theta_0$ are each electrical angle.

8 Claims, 6 Drawing Sheets

PERMANENT MAGNET TYPE STEPPING MOTOR

BACKGROUND OF THE INVENTION

1. Field of the Invention

This invention relates to a permanent magnet type stepping motor and, more particularly, relates to an improvement of a hybrid type stepping motor wherein the characteristic feature of stiffness (the torque curve of the motor energized with direct current) and the cogging torque are improved, for use in the driving source of office automation machines, such as the scanner of reproducing machines.

2. Description of the Prior Art

Figure 1:
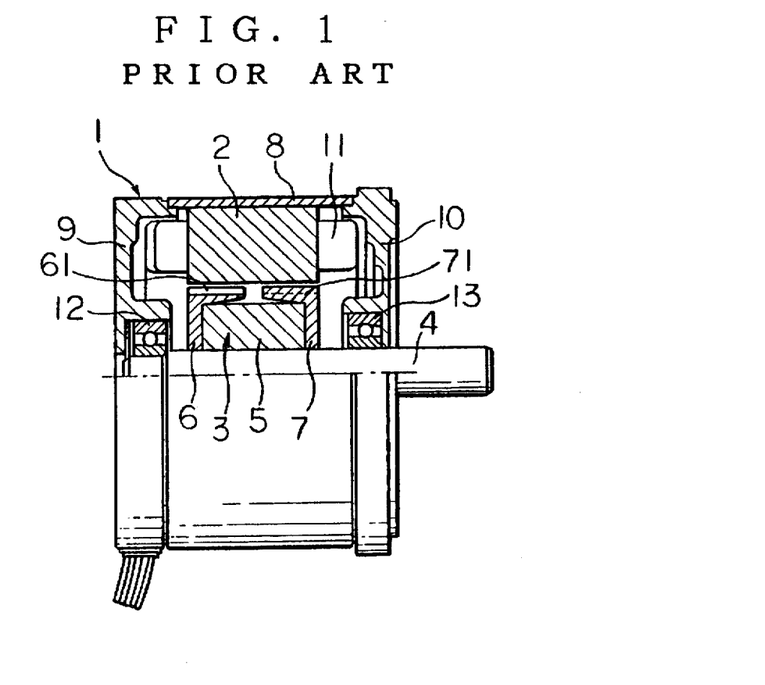
FIG. 1 is a vertically sectional side view of a conventional hybrid type stepping motor.
Figure 2:
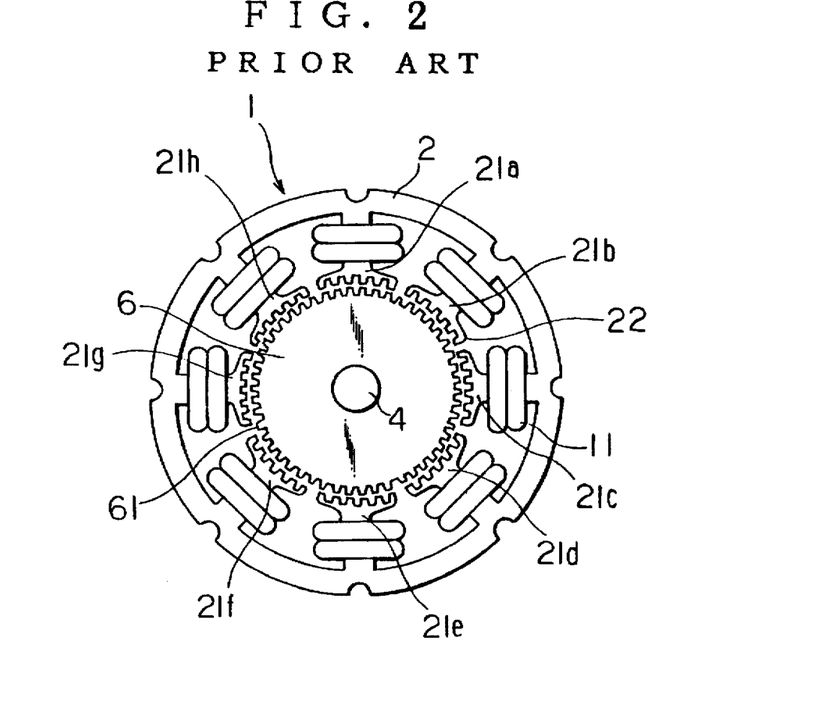
FIG. 2 is a vertically sectional front view of the motor shown in FIG. 1.

FIG. 1 is a vertically sectional side view of a conventional two-phase hybrid type stepping motor, and FIG. 2 is a vertically sectional front view of the motor shown in FIG. 1.

FIGS. 1 and 2, reference numeral 1 denotes a stepping motor. Numeral 2 is a stator, 3 is a rotor, 4 is a rotor shaft, 5 is a permanent magnet in the rotor 3, 6 and 7 are hybrid rotary magnetic poles for holding the permanent magnet 5 therebetween, 8 is a stator case, 9 and 10 are end brackets, 11 is a stator coil and 12 and 13 are bearings of the rotary shaft 4.

The stator 2 has eight stator magnetic poles 21a to 21h, each having six small teeth 22. On the outer peripheral surfaces of the rotary magnetic poles 6 and 7, fifty small teeth 61 and 71 are provided, respectively, at equal pitches (intervals). The pitch of the small teeth 61 and 71 of the rotor is set to 360°/50=7.2° in case of the two-phase motor and accordingly the step angle of the rotor becomes 7.2°×¼= 1.8°.

Figure 3:
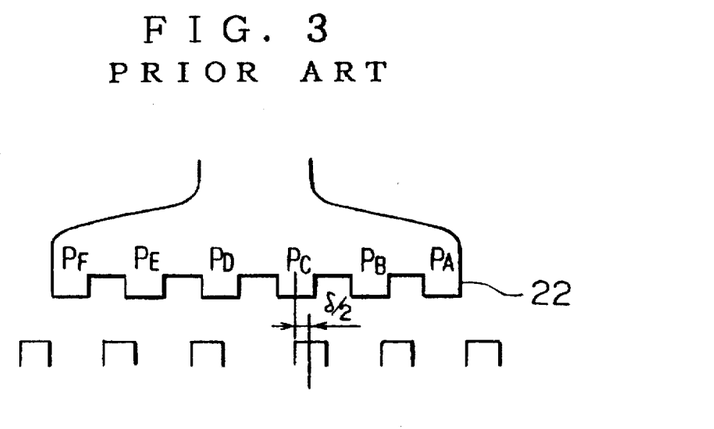
FIG. 3 is a view illustrating the small teeth of FIG. 2.

The pitch of the small teeth 22 of the stator 2 is 7.2° similar to the pitch of the small rotor teeth 61 and 71. However, the pitch of so-called vernier type motor of which cogging torque is low is designed to a value different from 7.2° as shown in FIG. 3. Such motor is used as a low vibration motor.

Figure 4:
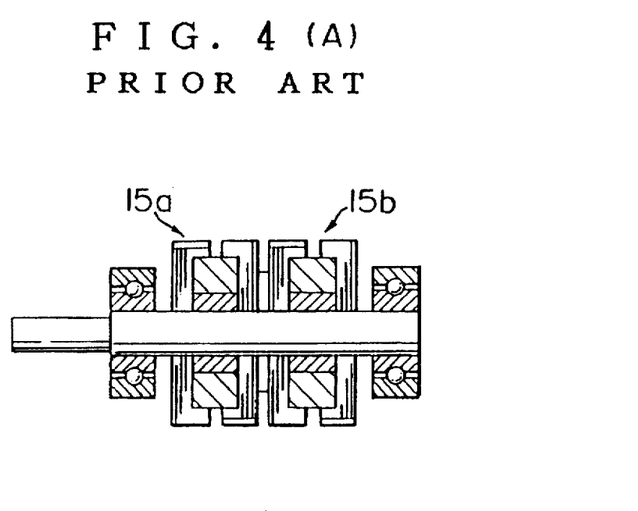
FIG. 4(A) is a vertically sectional side view of a rotor of another conventional hybrid type stepping motor.
FIG. 4(B) is a enlarged plan view of the pole teeth of the rotor shown in FIG. 4(A)

FIG. 4(A) shows a conventional stepping motor having two sets of rotor 15a and 15b as shown in U.S. Pat. No. 5,410,200. According to such motor, the third harmonic can be eliminated by deviating the pole teeth of the rotor by $\theta_0$ with each other as shown in FIG. 4(B), wherein $Nr\theta_0=\pi/3$.

Figure 5:
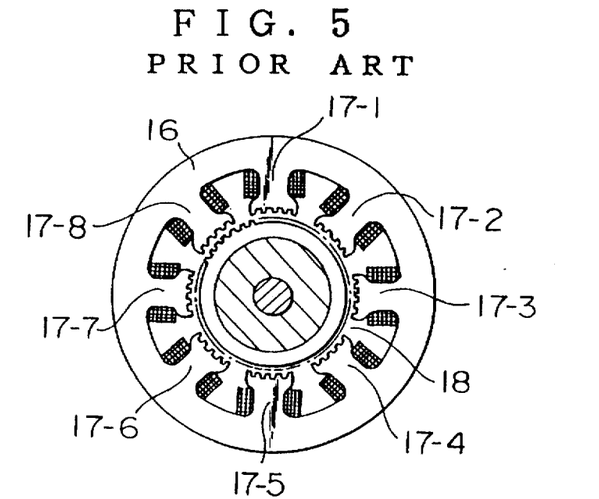
FIG. 5 is a vertically sectional front view of another conventional stepping motor.

Another conventional stepping motor is shown in Japanese Patent Laid-Open No. 212149/1991. Such stepping motor has a stator 16 with eight magnetic poles 17-1 to 17-8 each having a winding, and a rotor 18 with n pieces of pole tooth around the circumference thereof at equal pitches, facing the stator 16 with a gap therebetween as shown in FIG. 5. In the stepping motor, the pitch of ith magnetic pole of the stator (i=1, 2, - - - k) is set to (360°/n)·(1±1/qm), where m is the number of pole teeth of the ith magnetic pole of the stator and q is an integer not less than two.

In such stepping motor having the stator as mentioned above, the harmonic torque can be reduced.

However, in the conventional stepping motor shown in FIGS. 4(A) and 4(B), two sets of rotor are required, so that the motor cannot be formed thin.

Figure 6:
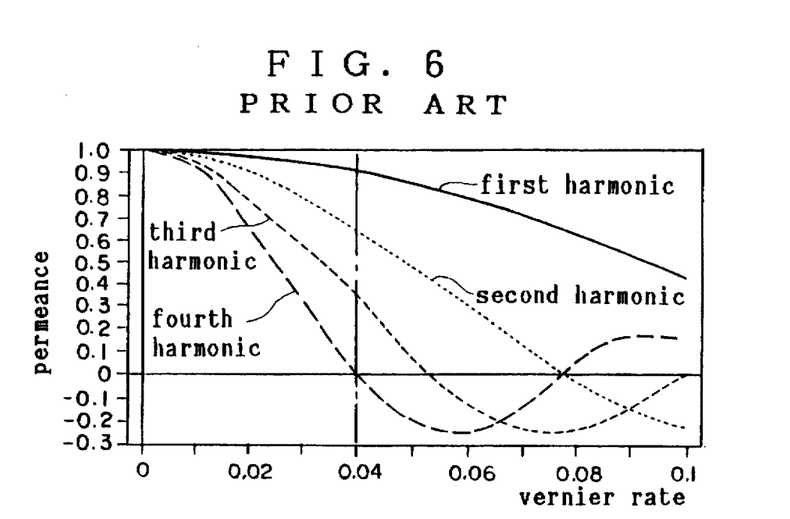
FIG. 6 is a graph showing the relationship between the vernier rate and the permeance of the conventional stepping motor.

Further, in the conventional stepping motor shown in FIGS. 1 and 2, only the vibration torque of fourth harmonic with respect to the fundamental wave can be reduced. As shown in FIG. 6, when the vernier rate is 0.04, the fourth harmonic component which is the cogging torque component becomes zero, and the fundamental wave (first harmonic) component is reduced by 10%. The above state can be calculated by the following formulas (1) to (4).

$$P_1 = \tfrac{2}{6}(\cos(\alpha/2) + \cos(3\times\alpha/2) + \cos(5\times\alpha/2)) \tag{1}$$

$$P_2 = \tfrac{2}{6}(\cos(\alpha) + \cos(3\times\alpha) + \cos(5\times\alpha)) \tag{2}$$

$$P_3 = \tfrac{2}{6}(\cos(3\times\alpha/2) + \cos(9\times\alpha/2) + \cos(15\times\alpha/2)) \tag{3}$$

$$P_4 = \tfrac{2}{6}(\cos(2\times\alpha) + \cos(6\times\alpha) + \cos(10\times\alpha)) \tag{4}$$

In the formulas, $P_1$ to $P_4$ represent values of the permeance, and the formulas (1) to (4) calculate the fundamental wave (first harmonic) to fourth harmonic components, respectively.

The permeance of the first harmonic component $P_1$ in FIG. 6 is calculated by the formula 1 using a value of $\alpha$ which is obtained from the formula (4) where $P_4$ is zero.

Accordingly, the two-phase motor has no problem if the fourth harmonic is reduced as mentioned above, because the vibration torque is formed mainly by the fourth harmonic. However, the three-phase motor has problems, because in such motor the vibration torque of the sixth harmonic is generated by the field magnetic fluxes due to the fifth and seventh harmonics.

SUMMARY OF THE INVENTION

An object of the present invention is to provide a permanent magnet stepping motor which eliminates the defects mentioned above.

Another object of the present invention is to provide a permanent magnet type stepping motor comprising a stator having a plurality of stator magnetic poles each having at least four small pole teeth, and a rotor having a plurality of small pole teeth arranged at equal pitches, facing said stator magnetic poles through a gap. The teeth are arranged in at least first and second pairs of teeth 1) with a first and a second tooth of at least one of the pairs being spaced apart from one another tooth positioned therebetween and 2) with a second tooth of the first pair being positioned adjacent a second tooth of the second pair. A pitch formed between two adjacent teeth is different from a pitch formed between two different adjacent teeth, the two different adjacent teeth comprising one of 1) the second tooth of the first pair and the second tooth of the second pair and 2) a common tooth present in both the first pair and the second pair and a tooth adjacent to the common tooth. A width of at least one of the two different adjacent teeth is different from the width of at least one of the remaining teeth.

Said tooth width of at least one of said adjacent small pole teeth forming said different pitch is set to a value between a value substantially equal to a valley width formed between said adjacent small pole teeth forming said different pitch and a half value thereof.

Still another object of the present invention is to provide a permanent magnet type stepping motor comprising a stator having n pieces of stator magnetic pole each having m pieces of pole tooth, and a rotor having a plurality of pole teeth arranged at equal pitches, facing said stator magnetic poles through a gap, characterized in that n is an integer not less than three, m is an even number not less than four, a pitch of the rotor pole teeth is $2\pi$, a pitch formed between (m/2)th stator pole tooth and [(m/2)+1]th stator pole tooth is set to $(\tau \pm \theta_0)$, and the other pitch formed between the [m/2)+1]th stator pole tooth and the [m/2+2]th stator pole teeth is set to $\tau$, where $|2\pi-\tau|<\pi/12$, $\pi/5 \leq \theta_0 < \pi/2$, and $\tau$ and $\theta_0$ are each electrical angle.

Yet another object of the present invention is to provide a permanent magnet type stepping motor comprising a stator having n pieces of stator magnetic pole each having m pieces of pole tooth, and a rotor having a plurality of pole teeth arranged at equal pitches, facing said stator magnetic poles through a gap, characterized in that n is an integer not less than three, m is an odd number not less than five, a pitch of the rotor pole teeth is $2\pi$, a pitch formed between two adjacent stator pole teeth at the center of each of the stator magnetic poles is set to ($\tau \pm \theta_0$), and the other pitch formed between two separate, unique pairs of small pole teeth of each of said stator magnetic poles, or formed between two adjacent teeth wherein one of the teeth is a tooth present in both the first and second pairs of small pole teeth and forming a pitch of ($\tau \pm \theta_0$) is set to $\tau$, where $|2\pi - \tau| < \pi/12$, $\pi/5 \leq \theta_0 < \pi/2$, and $\tau$ and $\theta_0$ are each electrical angle.

Further object of the present invention is to provide a permanent magnet type stepping motor comprising a stator having 3 L pieces of stator magnetic pole around which three-phase windings are wound, each having m pieces of pole tooth, and a rotor having a plurality of pole teeth arranged at equal pitches, facing said stator magnetic poles through a gap, characterized in that the pitch of the rotor pole teeth is an electrical angle of $2\pi$, the pitch of stator pole teeth is ($2\pi \pm \alpha$), L is an integer not less than two, m is an even number not less than four, and $\alpha_2 \leq \alpha \leq \alpha_1$ where $\alpha$, $\alpha_1$ and $\alpha_2$ are each electrical angle, $\alpha_1$ is expressed by $$\sum_{k=1}^{m/2} \cos 5 \left( k - \frac{1}{2} \right) \alpha_1 = 0,$$

and $\alpha_2$ is expressed by $$\sum_{k=1}^{m/2} \cos 7 \left( k - \frac{1}{2} \right) \alpha_2 = 0.$$

Still further object of the present invention is to provide a permanent magnet type stepping motor comprising a stator having 3 L pieces of stator magnetic pole around which three-phase windings are wound, each having m pieces of pole tooth, and a rotor having a plurality of pole teeth arranged at equal pitches, facing said stator magnetic poles through a gap, characterized in that the pitch of the rotor pole teeth is an electrical angle of $2\pi$, the pitch of stator pole teeth is ($2\pi \pm \alpha$), L is an integer not less than two, m is an odd number not less than three, and $\alpha_2 \leq \alpha \leq \alpha_1$, where $\alpha$, $\alpha_1$ and $\alpha_2$ are each electrical angle, $\alpha_1$ is expressed by $$1 + \sum_{k=1}^{(m-1)/2} \cos 5k\alpha_1 = 0,$$

and $\alpha_2$ is expressed by $$1 + \sum_{k=1}^{(m-1)/2} \cos 7k\alpha_2 = 0.$$

Said rotor comprises a cylindrical permanent magnet which is magnetized so as to have N-poles and S-poles, and hybrid rotary magnetic poles provided on both sides of the permanent magnet.

According to the present invention, when the distortion (harmonic component) in the cogging torque and the stiffness are corrected, the reduction in the permeance of the fundamental wave component can be suppressed. Further, the harmonic torque can be reduced by selecting the phase difference of $\theta_0$ (electrical angle) between the stator pole teeth and the rotor pole teeth suitably.

Further, according to the present invention, the third harmonic of permeance does not generate any vibration torque in the three-phase motor, and the components more than the fifth harmonic can be eliminated by providing the vernier slot.

These and other objects and features of the present invention will become apparent from the following description in conjunction with the attached drawings.

DESCRIPTION OF THE PREFERRED EMBODIMENT

Embodiments of this invention will be explained with reference to the drawings.

Figure 7:
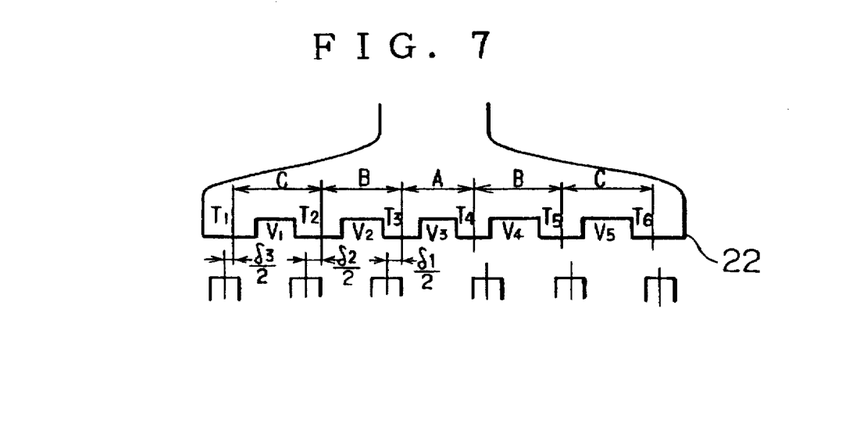
FIG. 7 shows the relationship between the tooth width and the pitch of the small teeth of the stator of a stepping motor according to the present invention.

In an embodiment of the present invention, as shown in FIG. 7, each stator magnetic pole has six small teeth $T_1$ to $T_6$. Teeth $T_3$ and $T_4$ are the same in tooth width, $T_2$ and $T_5$ are the same in tooth width, and $T_1$ and $T_6$ are the same in tooth width.

A pitch A between the teeth $T_3$ and $T_4$, a pitch B between the teeth $T_3$ and $T_2$ as like as $T_4$ and $T_5$, and a pitch C between the teeth $T_5$ and $T_6$ as like as $T_2$ and $T_1$ are different from one another.

Generally speaking, the cogging torque is affected to a great extent by the tooth width of the small teeth of the stator magnetic pole. It is well known that the cogging torque becomes zero theoretically without having any relation to the tooth width of the small teeth of the stator magnetic pole, if the tooth width and the interval (valley width) of the adjacent teeth are the same. The characteristic curve of the stiffness approaches a sine wave, if the cogging torque is zero, so that the vibration property and the precision of stop in the micro-step operation are improved. In practice, a state that the tooth width is equal to the valley width (the electrical angle of $\pi$) is determined as maximum and a state that the tooth width is 50% of the bottom width (electrical angle of $4\pi/5$) is determined as minimum. The electrical angle of $4\pi/5$ becomes the maximum substantially if it is made the sacrifice of the cogging torque.

In FIG. 7, a bottom width between the teeth $T_1$ and $T_2$ is $V_1$, a bottom width between the teeth $T_2$ and $T_3$ is $V_2$, a bottom width between the teeth $T_3$ and $T_4$ is $V_3$, a bottom width between the teeth $T_4$ and $T_5$ is $V_4$, and a bottom width between the teeth $T_5$ and $T_6$ is $V_5$. In the embodiment of the present invention, said $V_3$ is equal to the tooth width of the teeth $T_3$ and $T_4$.

In FIG. 7, if the pitch of small teeth is so selected that the fourth harmonic component $P_4$ becomes zero, the fundamental wave component $P_1$ and the fourth harmonic component $P_4$ can be expressed by formulas (5) and (6), respectively.

$$P_1 = \left\{ \cos\left( \frac{0.27}{7.2} \times 2\pi \right) + \cos\left( \frac{0.63}{7.2} \times 2\pi \right) + \cos\left( \frac{0.45}{7.2} \times 2\pi \right) \right\} 2/6 \approx 0.92 \quad (5)$$

$$P_4 = \left\{ \cos\left( \frac{4 \times 0.27}{7.2} \times 2\pi \right) + \cos\left( \frac{4 \times 0.63}{7.2} \times 2\pi \right) + \cos\left( \frac{4 \times 0.45}{7.2} \times 2\pi \right) \right\} 2/6 = 0 \quad (6)$$

In FIG. 7, the pitch $A=\theta_0$, $B=\theta_0+\theta_1$, $C=\theta_0+\theta_2$, $\theta_0=6.66°$, $\theta_1=0.18°$, and $\theta_2=0.72°$.

Accordingly, $A=6.66°$, $B=6.84°$, and $C=7.38°$.

As stated above, when phase differences of $\delta_1$, $\delta_2$, $\delta_3$ are formed between small teeth of the stator magnetic pole and the corresponding small teeth arranged at equal pitches on the rotor, respectively, as shown in FIG. 7, the permeance $P_1$ in the formula (5) becomes 92% at the state that $P_4$ in the formula (6) is zero, so that the permeance $P_1$ becomes larger than is conventional.

It is preferable that the phase differences $\delta_1$ to $\delta_3$ are determined as $(\frac{1}{2})\delta_1=0.075\pi$, $(\frac{1}{2})\delta_2=0.175\pi$, and $(\frac{1}{2})\delta_3=0.125\pi$ (electrical angle).

Other embodiments of the present invention will now be explained with reference to FIGS. 8 to 13.

Figure 8:
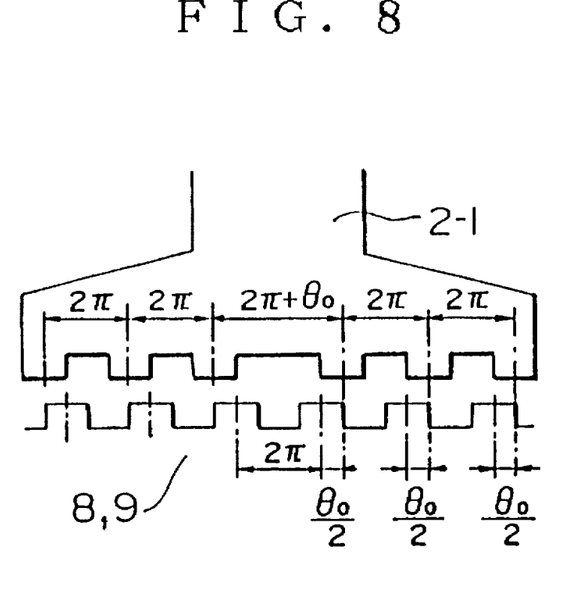
FIG. 8 shows the relationship between the tooth width and the pitch of the small teeth of the stator of a stepping motor according to another embodiment of the present invention.

In the embodiment shown in FIG. 8, the number of stator pole teeth is even, and the pitch of the center pole teeth is $(2\pi+\theta_0)$ which is deviated by $\theta_0$ from the pitches of the remaining pole teeth. Each of the pitches of the remaining pole teeth is $2\pi$ or other value, but equal to one another.

The pitch of the corresponding rotor pole teeth is $2\pi$ (electrical angle).

Figure 9:
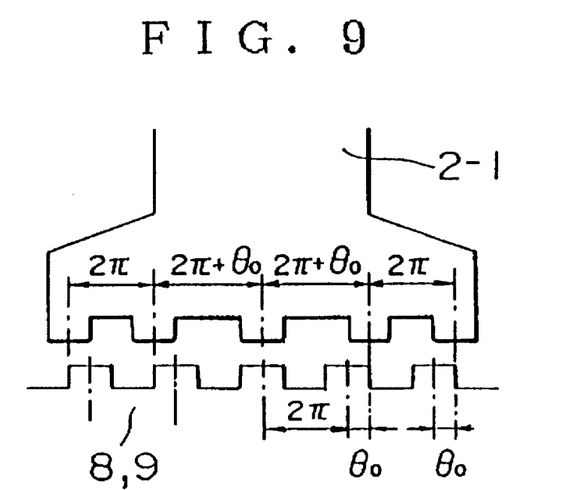
FIG. 9 shows the relationship between the tooth width and the pitch of the small teeth of the stator of a stepping motor according to another embodiment of the present invention.

In the embodiment shown In Pig. 9, the number of stator pole teeth is odd, and each of the central two pitches of the pole teeth is $(2\pi+\theta_0)$ which is different by $\theta_0$ from each of the pitches of the both side pole teeth. The pitch of the corresponding rotor pole teeth is $2\pi$.

The function of the embodiment shown in FIG. 8 will be explained with reference to formulas (7) to (9).

$$P(\theta) = \frac{P_0}{2} \left[ \left\{ \sin\left(\theta - \frac{\theta_0}{2}\right) + k_3\sin 3\left(\theta - \frac{\theta_0}{2}\right) + k_5\sin 5\left(\theta - \frac{\theta_0}{2}\right) + \ldots \right\} + \left\{ \epsilon_{s1}\sin\left(\theta + \frac{\theta_0}{2}\right) + k_3\sin 3\left(\theta + \frac{\theta_0}{2}\right) + k_5\sin 5\left(\theta + \frac{\theta_0}{2}\right) + \ldots \right\} \right] \quad (7)$$

$$\epsilon_{pq} = \cos\{(q \cdot \theta_0)/2\} \quad (8)$$

$$P(\theta) = P_0[\epsilon_{p1}\sin\theta + \epsilon_{p3}k_3\sin 3\theta + \epsilon_{p5}k_5\sin 5\theta + \ldots] \quad (9)$$

In formulas 7–9, $\theta$ shows a rotary angle (electrical angle) of the rotor, P shows a permeance of the air gap and $k_3$ and $k_5$ are the maximum amplitude ratio of the third and the fifth harmonics relative to the fundamental wave.

The first term of the formula (7) shows the permeance of the stator pole teeth at the left side from the center in FIG. 8, whereas the second term thereof shows the permeance of the stator pole teeth at the right side from the center in FIG. 8.

With respect to the ninth harmonic, $P(\theta)$ can be expressed as the formula (9) by correcting the formula (7) with a coefficient shown in the formula (8).

The third harmonic component in the formula (9) can be eliminated if $\theta_0$ is set to $\pi/3$ in FIG. 8 so that $P_3$ becomes zero.

Similarly, the fifth harmonic component in the formula (9) can be eliminated if $\theta_0$ is set to $\pi/5$. In the formula (9), $P_0$ is the permeance and shows the maximum value of the fundamental wave component of $P(\theta)$.

Figure 10:
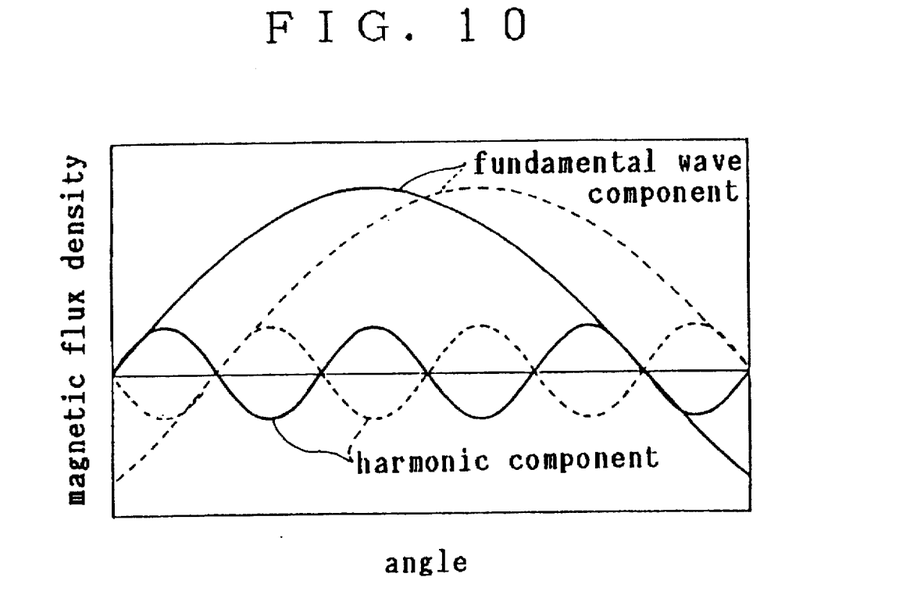
FIG. 10 is a graph showing the relationship between the angle and the magnetic flux density in order to explain the principle of the reduction of harmonics.

In FIG. 10, the fundamental wave torque of solid line corresponds to the left side from the center in FIG. 8, whereas the fundamental wave torque of dotted line is corresponds to the right side from the center in FIG. 8. Accordingly, the harmonic torque is eliminated by the summarization of the two.

Figure 11:
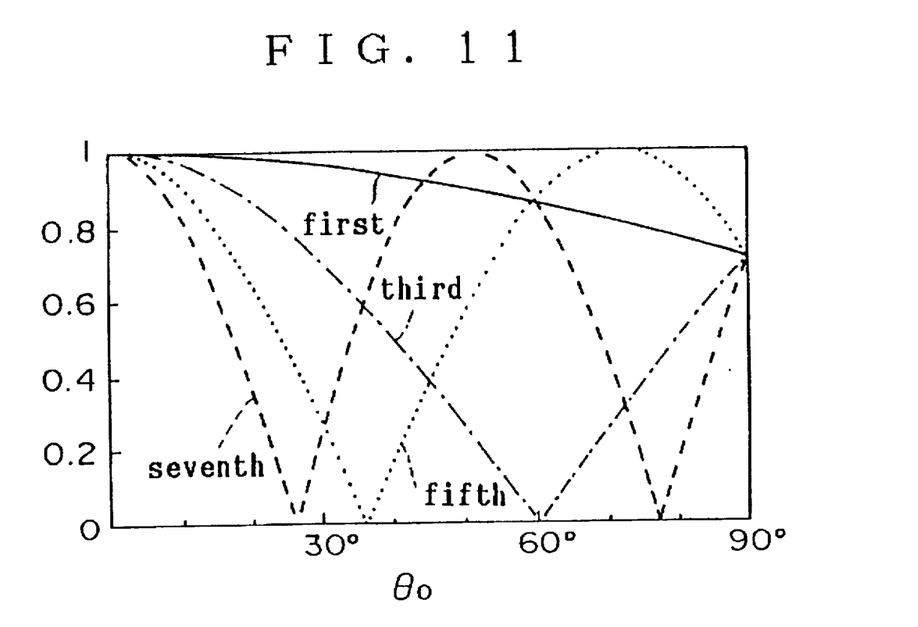
FIG. 11 is a graph showing the change of the harmonics with the angle of deviation of the teeth in order to explain the principle of the reduction of harmonics.

The reduction of each of the harmonics of $P(\theta)$ due to $\theta_0$ can be shown in FIG. 11. If $\theta_0 = \pi/3$ in FIG. 8, the third harmonic component becomes zero and the fundamental wave torque becomes 86.8%.

In the conventional vernier system wherein the stator pole teeth are arranged at equal pitches, when the third harmonic component becomes zero, the pitch of the rotor pole teeth becomes 24° (electrical angle) and $P_3=0$ in case that the number of the pole teeth is five, and the fundamental wave torque becomes 83.3%

Thus, according to the present invention, the torque can be increased by 3.3%

The function of the embodiment shown in FIG. 9 wherein the number of the pole teeth is odd is identical with the above and accordingly the detailed explanation thereof is omitted.

Figure 12:
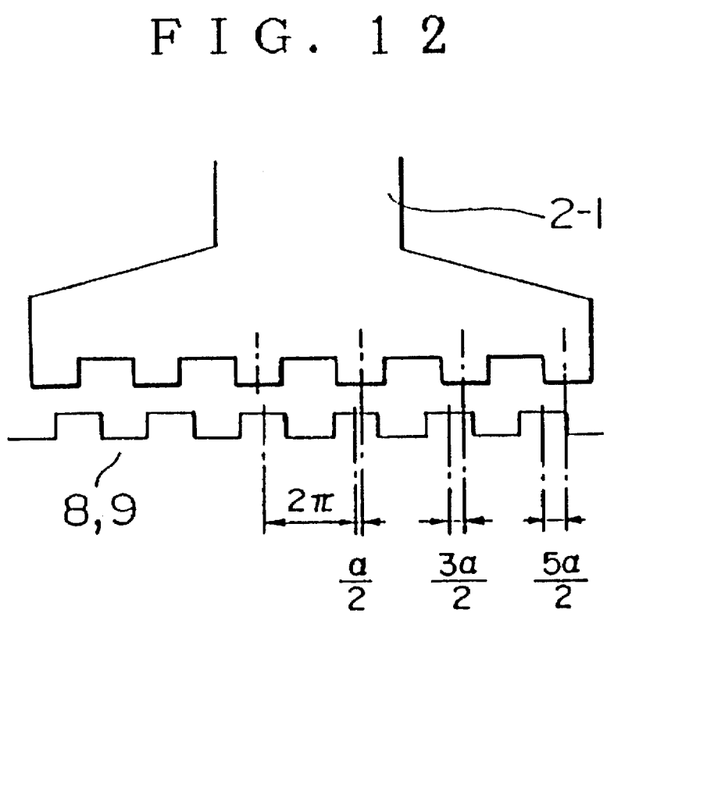
FIG. 12 shows the relationship between the tooth width and the pitch of the small teeth of the stator according to a stepping motor of another embodiment of the present invention.
Figure 13:
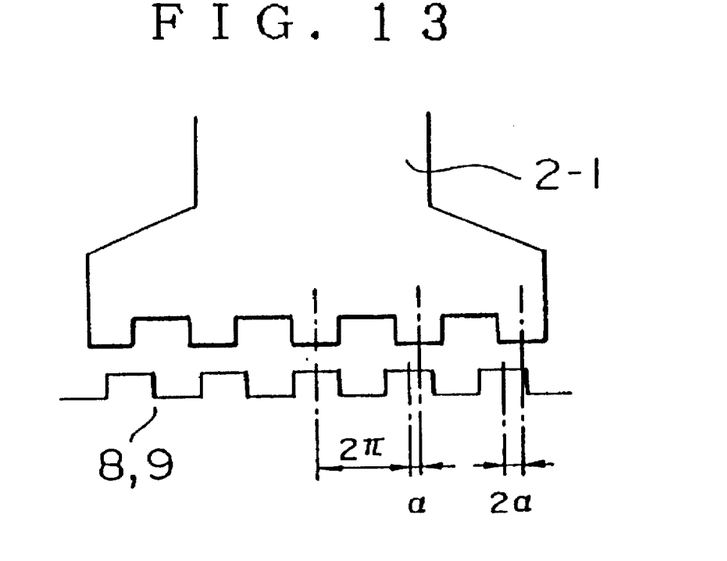
FIG. 13 shows the relationship between the tooth width and the pitch of the small teeth of the stator according to a stepping motor of the other embodiment of the present invention.

FIGS. 12 and 13 show the vernier slot of the three-phase stepping motor in the other embodiments of the present invention.

As stated above, in the stepping motor shown in FIG. 5, the fourth harmonic component can be eliminated, so that it is effective in the two-phase stepping motor. However, it is not effective in the three-phase stepping motor, the reasons of which will be explained with reference to formulas (10) to (14).

$$P(\theta) = P_0(k_1 \sin\theta + k_3 \sin 3\theta + k_5 \sin 5\theta + k_7 \sin 7\theta) \quad (10)$$

$$T = K'IP(\theta) \quad (11)$$

$$T_3 = K'I \{P(\theta)\sin\omega t + P\left(\theta - \frac{2\pi}{3}\right)\sin\left(\omega t - \frac{2\pi}{3}\right) + \quad (12)$$

$$P\left(\theta - \frac{4\pi}{3}\right)\sin\left(\omega t - \frac{4\pi}{3}\right) = \frac{3}{2} k'IP_o\{k_1\cos(\theta - \omega t) -$$

$$k_5\cos(5\theta + \omega t) + k_7\cos(7\theta - \omega t)\}$$

$$T_2 = K'IP_o\{K_1\cos(\theta-\omega t)+k_3\cos(3\theta+\omega t)-k_5\cos(5\theta-\omega t)+k_7\cos(7\theta+\omega t)\} \quad (13)$$

$$\omega t = \theta - \delta \quad (14)$$

The formulas (10) and (11) show the air gap permeance in the conventional stepping motor wherein only the odd harmonics are generated as publicly known.

In the formula (11), I is current and k' is a proportional constant. When the three-phase stepping motor is driven In micro-step operation, the current can be approximated to the sine wave, so that the torque can be expressed by $T_3$ in the formula 12, where ω is an angular velocity of current.

Further, currents Ia, Ib and Ic each to be supplied to each of phases of a, b and c of the three-phases stepping motor can be expressed as Ia=Isinωt, Ib=Isin(ωt−2π/3), and Ic=Isin(ωt−4π/3).

The relationship between an angular load δ, θ and ωt (t is time) can be expressed by the formula (14). By applying the value of ωt into the formula (12), the second term of the formula (12) becomes the sixth harmonic as shown by (5θ+ωt=6θ−δ) due to the fifth harmonic component of P(θ) and the current, and th third term becomes the sixth harmonic as shown by (7θ−ωt 6θ+θ) due to the seventh harmonic component of P(θ) and the current, so that it is understood that it includes the vibration torque of the sixth harmonic.

On the contrary in the two-phase stepping motor, in the micro-step operation, the currents Ia and Ib to be supplied to the phase a and the phase b of the motor, respectively, can be expressed as Ia=Isinωt and Ib=Isin(ωt−π/2). Accordingly, the torque $T_2$ to be generated can be expressed by the formula (13). The third, fifth and seventh terms in the formula (13) become (3θ+ωt=4θ−δ), (5θ−ωt=4θ+δ), and (7θ+ωt=8θ−δ), respectively so that it includes the vibration torque of the forth and eighth harmonics.

The elimination of the fourth harmonic can be accomplished by only the two-phase stepping motor and it is apparent from $T_3$ in the formula (12) that the elimination of the fourth harmonic is not effective for the three-phase stepping motor.

The comparison of the formulas (10) and (12) shows the fact that the third harmonic component in the formula (10) is eliminated in the formula (12).

Specifically, in the three-phase stepping motor, the third harmonic component does not generate any vibration torque, but the fifth and seventh harmonic components generate the vibration torque of the sixth harmonic. Accordingly, it should be understood that it is effective for the elimination of the vibration torque in the three-phase stepping motor to eliminate the fifth and seventh harmonic components of P(θ).

FIGS. 12 and 13 show the constructions of vernier slot of the stepping motor according to the present invention wherein the vibration torque is removed. In FIG. 12, the number of the stator pole teeth is even, such as six, whereas in FIG. 13, the number thereof is odd, such as five.

In each case, the pitch of the stator pole teeth is deviated by α (electrical angle) from the pitch of the rotor pole teeth, and the number of the stator magnetic poles is three times of integer.

In FIG. 12, the permeances of the fundamental wave component, and the third and fifth harmonic components $P_1$, $P_3$, and $P_5$ per one pole tooth can be expressed by formulas (15) to (17), respectively.

$$P_1 = \frac{2}{6} P_o\left(\cos\frac{\alpha}{2} + \cos\frac{3\alpha}{2} + \cos\frac{5\alpha}{2}\right) \quad (15)$$

$$P_3 = \frac{2}{6} P_o\left(\cos 3 \times \frac{\alpha}{2} + \cos 3 \times \frac{3\alpha}{2} + \cos 3 \times \frac{5\alpha}{2}\right) \quad (16)$$

$$P_5 = \frac{2}{6} P_o\left(\cos 5 \times \frac{\alpha}{2} + \cos 5 \times \frac{3\alpha}{2} + \cos 5 \times \frac{5\alpha}{2}\right) \quad (17)$$

In case of FIG. 12, the number of the stator pole teeth is six. However, cases wherein the number of the stator pole teeth is m, $P_5$ and $P_7$, can be expressed by formulas (18) and (19), respectively.

$$P_5 = \frac{2P_o}{m} \sum_{k=1}^{\frac{m}{2}} \cos 5\left(k - \frac{1}{2}\right)\alpha \quad (18)$$

$$P_7 = \frac{2P_o}{m} \sum_{k=1}^{\frac{m}{2}} \cos 7\left(k - \frac{1}{2}\right)\alpha \quad (19)$$

Similarly, in FIG. 18 wherein the number of the pole teeth is odd, such as five, the permeances $P_1$, $P_3$ and $P_5$ can be expressed by formulas (20), (21), and (22), respectively.

$$P_1 = \frac{P_o}{7} \{1 + 2(\cos\alpha + \cos 2\alpha + \cos 3\alpha)\} \quad (20)$$

$$P_3 = \frac{P_o}{7} \{1 + 2(\cos 3\alpha + \cos 6\alpha + \cos 9\alpha)\} \quad (21)$$

$$P_5 = \frac{P_o}{7} \{1 + 2(\cos 5\alpha + \cos 10\alpha + \cos 15\alpha)\} \quad (22)$$

In case that the number of the stator pole teeth in FIG. 13 is m, $P_5$ and $P_7$, can be expressed by formulas (23) and (24), respectively.

$$P_5 = \frac{P_o}{m}\left(1 + 2\sum_{k=1}^{(m-1)/2}\cos 5k\alpha\right) \quad (23)$$

$$P_7 = \frac{P_o}{m}\left(1 + 2\sum_{k=1}^{(m-1)/2}\cos 7k\alpha\right) \quad (24)$$

In the three-phase stepping motor, the third harmonic component is eliminated, so that it is enough to select the value of α such that $P_5$ and $P_7$ become zero, respectively, for the fifth and seventh harmonic components.

Further, it is not necessary to select the value of α strictly such that the fifth and seventh harmonic components become zero, and it is enough to reduce the fifth and seventh harmonic components for the three-phase stepping motor.

It should be understood that the elimination of harmonic components of larger amplitude is effective to reduce the vibration, because the amplitude of higher harmonics becomes smaller.

According to the permanent magnet type stepping motor shown in FIG. 7, the reduction of the permeance of the fundamental wave component can be limited to about 8% by merely changing the pitch of the stator small pole teeth theoretically. This means the improvement of 2% in permeance compared with the conventional stepping motor of vernier type wherein the reduction of the permeance is about 10%. Further, according to the present invention, the reduction of the permeance can be limited to a value less than 8% by varying the width of the stator small pole tooth so that the bottom width of the small pole tooth is equal to the width of the adjacent small pole tooth, and by making the width of the small pole tooth larger than that of the conventional vernier type stepping motor.

According to the stepping motors shown in FIGS. 8 and 9, the vibration torque can be reduced remarkably, because the construction of the stator pole teeth is specified. According to the three-phase stepping motors shown in FIGS. 12 and 13, the third harmonic component can also be eliminated, and the vibration torque can be suppressed to a great extent, by selecting the vernier angle so that the fifth and seventh harmonic components of the permeance are eliminated.

What is claimed is:

1. A permanent magnet type stepping motor comprising:
   a stator having a plurality of stator magnetic poles each having at least four small pole teeth; and
   a rotor facing said stator magnetic poles through a gap and having a plurality of small pole teeth arranged at equal pitches, wherein, in each of said stator magnetic poles, said teeth are arranged in at least first and second pairs of teeth 1) with a first tooth and a second tooth of at least one of said pairs being spaced apart from one another with another tooth positioned therebetween and 2) with a second tooth of said first pair being positioned adjacent a second tooth of said second pair,
   a pitch formed between two adjacent teeth is different from a pitch formed between two different adjacent teeth, the two different adjacent teeth comprising one of 1) the second tooth of said first pair and the second tooth of said second pair and 2) a common tooth present in both said first pair and said second pair and a tooth adjacent to said common tooth, and
   a width of at least one of said two different adjacent teeth is different from the width of at least one of the remaining teeth.

2. The permanent magnet type stepping motor as claimed in claim 1, wherein the width of said at least one tooth is approximately equal to one of 1) the width of a valley formed between said two different adjacent teeth and 2) one half the width of said valley.

3. A permanent magnet type stepping motor comprising:
   a stator having n magnetic poles each having m small stator pole teeth; and
   a rotor facing said stator magnetic poles through a gap and having a plurality of small pole teeth arranged at equal pitches, wherein
   n is an integer not less than three,
   m is an even number not less than four,
   $\tau$ is a first electrical angle,
   $\theta_0$ is a second electrical angle,
   a pitch of the rotor pole teeth is $2\pi$,
   $(2\pi-\tau)<\tau/12$,
   $\pi/5<\theta_0<\pi/2$,
   a pitch formed between an (m/2)th stator pole tooth and an [(m/2)+1]th stator pole tooth adjacent said (m/2)th stator pole tooth is $[\tau+\theta_0]$, and
   a pitch formed between said [(m/2)+1]th stator pole tooth and an [(m/2)+2]th stator pole tooth adjacent said [(m/2)+1]th stator pole tooth is $\tau$.

4. A permanent magnet type stepping motor comprising:
   a stator having n magnetic poles each having m small starer pole teeth; and
   a rotor facing said stator magnetic poles through a gap and having a plurality of small pole teeth arranged at equal pitches, wherein
   n is an integer not less than three,
   m is an even number not less than four,
   $\tau$ is a first electrical angle,
   $\theta_0$ is a second electrical angle,
   a pitch of the rotor pole teeth is $2\pi$,
   $(2\pi-\tau)<\tau/12$,
   $\pi/5 \leq \theta_0 <\pi/2$, and wherein, in each of said of said magnetic poles, said stator pole teeth are arranged in at least fast and second pairs of teeth 1)
   with a first tooth and a second tooth of at least one of said pairs being spaced apart from one another with another tooth positioned therebetween and 2) with a second tooth of said first pair being positioned adjacent a second tooth of said second pair,
   a pitch formed between two adjacent stator pole teeth at a center of the stator magnetic pole is $[\tau\pm\theta_0]$, and
   a pitch formed between two different adjacent stator pole teeth is $\tau$, the two different adjacent teeth comprising one of 1) the second tooth of said first pair and the second tooth of said second pair and 2) a common tooth present in both said first pair and said second pair and a tooth adjacent to said common tooth.

5. A permanent magnet type stepping motor comprising:
   a stator having 3 L stator magnetic poles around which three-phase windings are wound, each having m pieces of pole tooth; and
   a rotor facing said stator magnetic poles through a gap and having a plurality of pole teeth arranged at equal pitches, wherein
   the pitch of the rotor pole teeth is an electric angle of $2\pi$,
   a pitch between each adjacent set of stator pole teeth is ($2\pi\pm$ a value $\alpha$ between $\alpha_1$ and $\alpha_2$),
   L is an integer not less than two,
   m is an even number not less than four,
   $\alpha$, $\alpha_1$ and $\alpha_2$ are each an electrical angle,
   $\alpha_1$ is expressed by $$\sum_{k=1}^{m/2} \cos 5\left(k-\frac{1}{2}\right)\alpha_1 = 0$$

$\alpha_2$ is expressed by $$\sum_{k=1}^{m/2} \cos 7\left(k-\frac{1}{2}\right)\alpha_2 = 0$$

k is a constant.

6. A permanent magnet type stepping motor comprising:
   a stator having 3 L stator magnetic poles around which three-phase windings are wound, each having m pieces of pole tooth; and
   a rotor facing said stator magnetic poles through a gap and having a plurality of pole teeth arranged to equal pitches, wherein
   the pitch of the rotor pole teeth is an electrical angle of $2\pi$;
   a pitch between each adjacent pair of stator pole teeth is ($2\pi\pm$ a value a between $\alpha_1$ and $\alpha_2$)
   L is an integer not less than two,
   m is an odd number not less than three,
   $\alpha$, $\alpha_1$ and $\alpha_2$ are each an electrical angle, $\alpha_1$ is expressed by $$1 + \sum_{k=1}^{(m-1)/2} \cos 5k\alpha_1 = 0$$

$\alpha_2$ is expressed by $$1 + \sum_{k=1}^{(m-1)/2} \cos 7k\alpha_2 = 0$$

k is a constant.

7. The permanent magnet type stepping motor as claimed in claim 5, wherein said rotor comprises 1) a cylindrical permanent magnet which is magnetized axially so as to have N-poles and S-poles, and 2) hybrid rotary magnetic poles provided on both sides of the permanent magnet.

8. The permanent magnet type stepping motor as claimed in claim 6, wherein said rotor comprises 1) a cylindrical permanent magnet which is magnetized axially so as to have N-poles and S-poles, and 2) hybrid rotary magnetic poles provided on both sides of the permanent magnet.

* * * * *